(12) United States Patent
Ali et al.

(10) Patent No.: US 9,954,683 B2
(45) Date of Patent: Apr. 24, 2018

(54) NATURAL VISUALIZATION AND ROUTING OF DIGITAL SIGNATURES

(71) Applicant: Microsoft Technology Licensing, LLC, Redmond, WA (US)

(72) Inventors: Alnur Ali, Kirkland, WA (US); Hyong Guk Kim, Seoul (KR); Alexander Malek, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 14/966,146

(22) Filed: Dec. 11, 2015

(65) Prior Publication Data
US 2016/0099812 A1    Apr. 7, 2016

Related U.S. Application Data

(62) Division of application No. 12/253,344, filed on Oct. 17, 2008, now abandoned.

(51) Int. Cl.
*H04L 9/32* (2006.01)
*H04L 29/06* (2006.01)

(52) U.S. Cl.
CPC ........ *H04L 9/3247* (2013.01); *H04L 63/0457* (2013.01); *H04L 63/0823* (2013.01);
(Continued)

(58) Field of Classification Search
CPC .............. H04L 9/3247; H04L 63/0823; H04L 63/0457; H04L 63/0876; H04L 2209/68; H04L 2209/80
See application file for complete search history.

(56) References Cited

U.S. PATENT DOCUMENTS 5,606,609 A    2/1997  Houser et al.
5,689,567 A   11/1997  Miyauchi
(Continued)

FOREIGN PATENT DOCUMENTS

EP    982927    3/2000

OTHER PUBLICATIONS

Wan et al., On-line signature verification with two-stage statistical models, Aug. 2005, Eighth International Conference on Document Analysis and Recognition, vol. 1, pp. 282-286 (Year: 2005).*
(Continued)

*Primary Examiner* — Kenneth W Chang

(57) ABSTRACT

Embodiments are provided for securely visualizing and routing digital signatures in an electronic document generated by an application program executing on a computer system. The application program may generate an electronic document for receiving a signature graphic, and calculate a hash value from the electronic document and the signature graphic, and create a cryptographic signature from the hash value using a cryptographic encryption method. The electronic document is digitally signed by embedding the cryptographic signature therein. The application program may further collect and route digital signatures by automatically collecting signatures from individual signers, one-by-one, and identify the appropriate signature line for each signer to sign. The application program may further generate a user interface for creating and collecting digital signatures.

20 Claims, 13 Drawing Sheets

(52) U.S. Cl.
CPC ...... *H04L 63/0876* (2013.01); *H04L 2209/68* (2013.01); *H04L 2209/80* (2013.01)

(56) References Cited

U.S. PATENT DOCUMENTS

| | | | |
|---|---|---|---|
| 5,948,103 | A | 9/1999 | Fukuzaki |
| 6,161,116 | A | 12/2000 | Saltzman |
| 6,757,826 | B1 | 5/2004 | Paltenghe |
| 6,944,648 | B2 | 9/2005 | Cochran |
| 6,975,992 | B2 | 12/2005 | Tucker et al. |
| 7,024,562 | B1 | 4/2006 | Flink et al. |
| 7,406,599 | B1 | 7/2008 | Pravetz |
| 9,514,117 | B2 | 12/2016 | Gonser |
| 2001/0021928 | A1* | 9/2001 | Ludwig ............ G06Q 20/3674 705/67 |
| 2002/0019937 | A1 | 2/2002 | Edstrom |
| 2002/0048372 | A1 | 4/2002 | Toh et al. |
| 2002/0063734 | A1 | 5/2002 | Khalfay et al. |
| 2002/0069179 | A1* | 6/2002 | Slater ............... G06Q 20/00 705/67 |
| 2002/0078358 | A1* | 6/2002 | Neff ................. G06F 21/33 713/176 |
| 2002/0095579 | A1 | 7/2002 | Yoshiura et al. |
| 2002/0143704 | A1 | 10/2002 | Nassiri |
| 2002/0143711 | A1 | 10/2002 | Nassiri |
| 2002/0184504 | A1* | 12/2002 | Hughes ............. H04L 9/3236 713/177 |
| 2003/0217264 | A1 | 11/2003 | Martin |
| 2004/0039914 | A1 | 2/2004 | Barr et al. |
| 2004/0133493 | A1* | 7/2004 | Ford ................. G06Q 10/10 705/35 |
| 2004/0181756 | A1 | 9/2004 | Berringer |
| 2004/0236694 | A1 | 11/2004 | Tattan et al. |
| 2005/0036651 | A1 | 2/2005 | Wen |
| 2005/0132195 | A1 | 6/2005 | Dietl |
| 2005/0132196 | A1 | 6/2005 | Dietl |
| 2005/0177389 | A1* | 8/2005 | Rakowicz ......... G06Q 20/3829 705/75 |
| 2005/0246284 | A1 | 11/2005 | Phillipo et al. |
| 2006/0047963 | A1 | 3/2006 | Brown |
| 2006/0072144 | A1* | 4/2006 | Dowling ............ G06F 21/606 358/1.15 |
| 2006/0271787 | A1 | 11/2006 | DeYoung et al. |
| 2006/0277452 | A1 | 12/2006 | Villaron et al. |
| 2007/0016785 | A1 | 1/2007 | Guay et al. |
| 2007/0094510 | A1 | 4/2007 | Ross |
| 2007/0174629 | A1 | 7/2007 | Suominen |
| 2008/0010218 | A1 | 1/2008 | Zank |
| 2008/0046984 | A1 | 2/2008 | Bohmer |
| 2008/0065775 | A1 | 3/2008 | Polk |
| 2008/0072334 | A1* | 3/2008 | Bailey .............. G06Q 10/10 726/28 |
| 2008/0100874 | A1 | 5/2008 | Mayer |
| 2008/0104408 | A1 | 5/2008 | Mayer |
| 2008/0109657 | A1 | 5/2008 | Bajaj et al. |
| 2008/0141033 | A1 | 5/2008 | Ginter |
| 2008/0133929 | A1 | 6/2008 | Gehrmann et al. |
| 2008/0148054 | A1 | 6/2008 | Cahill et al. |
| 2008/0209313 | A1 | 8/2008 | Gonser |
| 2009/0024912 | A1 | 1/2009 | McCabe |
| 2009/0025090 | A1 | 1/2009 | Clement et al. |
| 2009/0119221 | A1 | 5/2009 | Weston et al. |
| 2010/0100743 | A1 | 4/2010 | Alnur |
| 2010/0106973 | A1 | 4/2010 | Guenther |
| 2010/0161969 | A1 | 6/2010 | Grebovich et al. |

OTHER PUBLICATIONS

U.S. Appl. No. 12/253,344, Office Action dated Jul. 29, 2016, 22 pages.
U.S. Appl. No. 12/253,344, Amendment filed Nov. 29, 2016, 16 pages.
U.S. Appl. No. 12/253,344, Office Action dated Apr. 6, 2017, 19 pages.
U.S. Appl. No. 12/253,344, Office Action, dated Dec. 21, 2012, 9 pages.
U.S. Appl. No. 12/253,344, Office Action, dated Nov. 21, 2011, 18 pages.
U.S. Appl. No. 12/253,344, Office Action, dated Sep. 12, 2013, 19 pages.
U.S. Appl. No. 12/253,344, Office Action, dated Apr. 10, 2014, 18 pages.
U.S. Appl. No. 12/253,344, Office Action, dated Oct. 5, 2012, 11 pages.
U.S. Appl. No. 12/253,344, Office Action, dated May 24, 2011, 11 pages.
U.S. Appl. No. 12/253,344, Notice of Non-Compliant Amendment, dated Sep. 28, 2015, 2 pages.
U.S. Appl. No. 12/253,344, Amendment filed Aug. 24, 2011, 13 pages.
U.S. Appl. No. 12/253,344, Amendment filed Mar. 21, 2012, 12 pages.
U.S. Appl. No. 12/253,344, Amendment filed Jan. 7, 2013, 15 pages.
U.S. Appl. No. 12/253,344, Amendment filed Dec. 12, 2013, 14 pages.
U.S. Appl. No. 12/253,344, Amendment filed Jul. 9, 2014, 15 pages.
U.S. Appl. No. 12/253,344, Amendment filed Apr. 21, 2015, 9 pages.
U.S. Appl. No. 12/253,344, Amendment filed Nov. 30, 2015, 14 pages.
"Digital Signature Label Architecture", retrieved at http://nelson.w3.org/TR/WD-DSIG-label-arch, Jun. 10, 1997, 14 pages.
"Towards Concrete Application of Electronic Signature" Retrieved at http://security.polito.it/diana/Articles/e_sign.pdf, Dec. 6, 2012, 16 pages.
"Hidden Digital Watermarks in Images", Retrieved at http://ieeexplore.ieee.org/iel4/83/15895/00736686.pdf?isnumber=15895&prod=STD&arnumber=736686&arnumber=736686&arSt=58&ared=68&arAuthor=Chiou-Ting+Hsu%3B+Ja-Ling+Wu, Jan. 1999, 11 pages.

* cited by examiner

FIG. 8

SIGN

ⓘ SEE ADDITIONAL INFORMATION ABOUT WHAT YOU ARE SIGNING...

VERIFY THAT THE FORM OR SECTION YOU ARE SIGNING IS CORRECT, AS WELL AS THE ADDITIONAL INFORMATION THAT WILL BE STORED WITH YOUR SIGNATURE.

TYPE YOUR NAME BELOW OR CLICK SELECT IMAGE TO SELECT A PICTURE TO USE AS YOUR SIGNATURE:

X |     SELECT IMAGE...

JEFF RAIKES
MANAGER

PURPOSE FOR SIGNING THIS DOCUMENT:

SIGNING AS: ALNUR ALI
ISSUED BY: MICROSOFT CORP ENTERPRISE CA 2

[SIGN] [CHANGE...] [CANCEL]

NATURAL VISUALIZATION AND ROUTING OF DIGITAL SIGNATURES

CROSS-REFERENCE TO RELATED APPLICATIONS

This application is a divisional application of U.S. patent application Ser. No. 12/253,344, entitled "NATURAL VISUALIZATION AND ROUTING OF DIGITAL SIGNATURES," filed on Oct. 17, 2008, the complete disclosure of which is hereby incorporated by reference in its entirety.

BACKGROUND

Many software applications allow users to digitally sign electronic documents as a means to make paper-based signatures more secure. Typically, digital signatures include a digital code that can be attached to an electronic document to uniquely identify the author. Like a written signature, the purpose of a digital signature is to guarantee that the individual signing (and subsequently sending the document to others) is who he or she claims to be. Typically, users may "sign" an electronic document by clicking a "sign" button in an application program user interface to apply the digital signature. The applied digital signature may include an identification of the name of the signer (e.g., "Signed by . . . ) as well as the date and time the signature was received by the application program. If an electronic document is to be signed by multiple signers, copies of the document may be e-mailed to each signer for receiving their signatures.

Current methods of applying and collecting digital signatures however, suffer from several drawbacks. One drawback in the application of digital signatures is that many application programs do not allow the use of natural signature graphics (i.e., script or handwritten signatures) when digitally signing electronic documents. While some application programs do allow for a user to copy and paste digital signatures directly into an electronic document, these signatures are not cryptographically secure as the application programs allow anyone to easily replace the signature graphic of the original signer with that of another user. One drawback with the collection of digital signatures is that current methods of sending out multiple copies of an electronic document to multiple signers incur problems with managing the various versions of the document, merging edits to the document (different signers may edit the document differently), and finding the position on the document where the document author intended each signer to sign (the signer may need to read through lines of text to find the appropriate place for receiving their signature). Currently, these problems must be addressed manually resulting in wasted time and resources in collecting all of the signatures. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for securely visualizing and routing digital signatures in an electronic document generated by an application program executing on a computer system. The application program may generate an electronic document for receiving a signature graphic. A hash value may then be calculated from the electronic document including the signature graphic. A digital signature object may be generated which includes the hash value and cryptographic data. The digital signature object may be embedded in the electronic document as a cryptographic signature. The electronic document including the signature graphic and the digital signature object may then be displayed to a user as a digital signature.

In another embodiment, the application program may collect multiple digital signatures in an electronic document for routing to individual signers, one-by-one. The application program may send a link to an electronic document to only one current signer identified by an unsigned signature line from among multiple signature lines available for receiving a digital signature in the electronic document. The application program may further automatically select, from among the multiple signature lines, the unsigned signature line for receiving the digital signature from the current signer receiving the link to the electronic document. The selected unsigned signature line is then made available for the current signer to sign. Once the current signer's signature is received, the application program may send the link to the electronic document to other signers for signing the document, one-by-one, until each of the signatures for the electronic document has been received.

In yet another embodiment, the application program may be utilized to display a user interface for generating and validating signature data for securely visualizing digital signatures in an electronic document. The application program may display a first window for receiving a signature graphic or digital signature associated with a signer of the electronic document. The application program may further displaying the received signature graphic in the first window, validate the received signature graphic against a digital signature object embedded in the electronic document, and display a second window for defining the display of a plurality of signature line properties for one or more signature lines displayed in the electronic document. The signature line properties may include signature data which may further include a name of the signer of the electronic document, a title of the signer of the electronic document, or an electronic mail address associated with the signer of the electronic document. The application program may further display, in the second window appearance options for displaying the signature graphic in the electronic document. The appearance options may include a first option for displaying the signature graphic over the signature line, a second option for displaying the signature graphic as a stamp compatible with an Eastern signature format, and a third option for displaying a date that the electronic document was signed. The application program may further display a third window for defining signature properties for the electronic document. The signature properties may include user-selectable selectable options including: a first option for signing the entire electronic document, a second option for signing one or more identified portions of the electronic document, a third option for co-signing multiple signature lines in the electronic document, and a fourth option for counter-signing multiple signatures lines in the electronic document.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 8 is a computer screen display of a user interface which may be utilized to receive a signature graphic for digitally signing an electronic document, in accordance with an embodiment;

DETAILED DESCRIPTION

Figure 1:
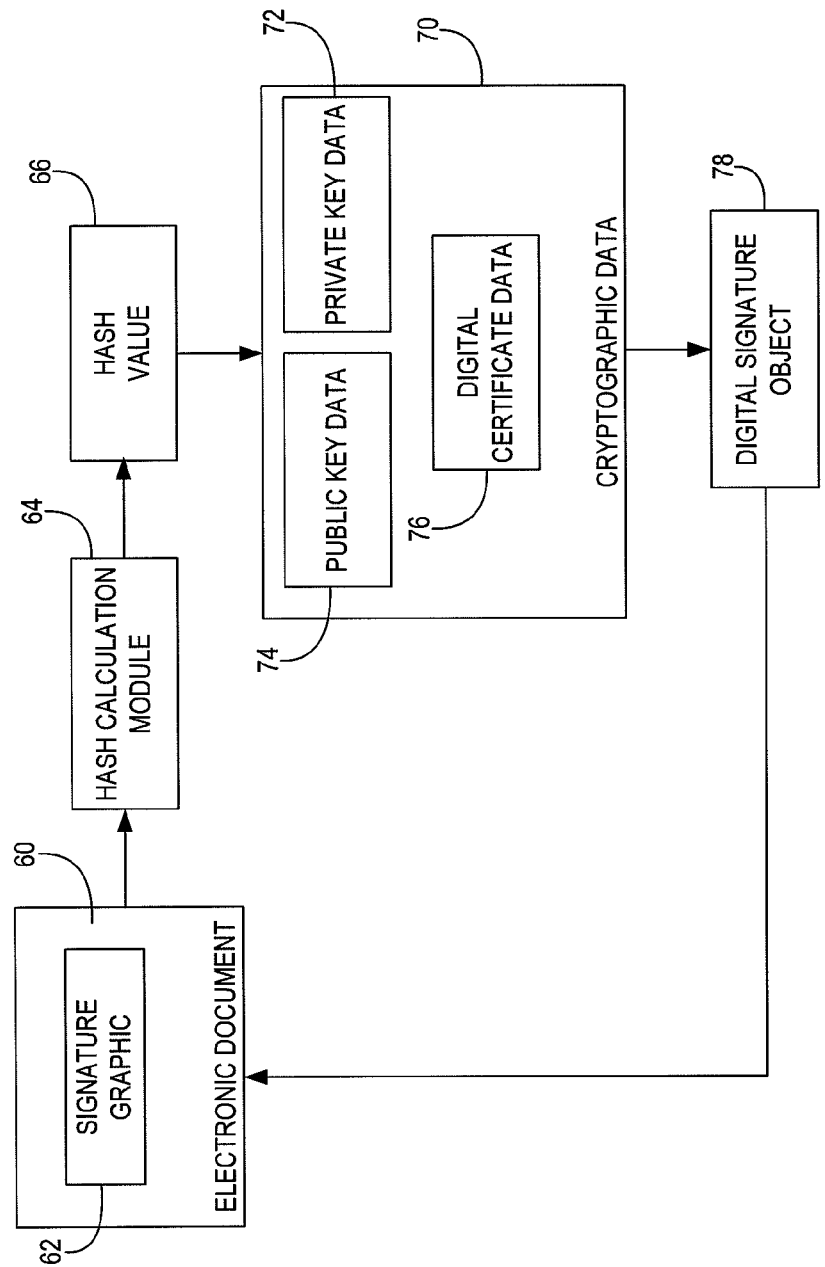
FIG. 1 is a block diagram illustrating the creation of secure digital signatures using a signature graphic, in accordance with various embodiments.

Embodiments are provided for securely visualizing and routing digital signatures in an electronic document generated by an application program executing on a computer system. The application program may generate an electronic document for receiving a signature graphic. A hash value may then be calculated from the electronic document including the signature graphic. A digital signature object may be generated which includes the hash value and cryptographic data. The digital signature object may be embedded in the electronic document as a cryptographic signature. The electronic document including the signature graphic and the digital signature object may then be displayed to a user as a digital signature.

In another embodiment, the application program may collect multiple digital signatures in an electronic document for routing to individual signers, one-by-one. The application program may send a link to an electronic document to only one current signer identified by an unsigned signature line from among multiple signature lines available for receiving a digital signature in the electronic document. The application program may further automatically select, from among the multiple signature lines, the unsigned signature line for receiving the digital signature from the current signer receiving the link to the electronic document. The selected unsigned signature line is then made available for the current signer to sign. Once the current signer's signature is received, the application program may send the link to the electronic document to other signers for signing the document, one-by-one, until each of the signatures for the electronic document has been received.

In yet another embodiment, the application program may be utilized to display a user interface for generating and validating signature data for securely visualizing digital signatures in an electronic document. The application program may display a first window for receiving a signature graphic or digital signature associated with a signer of the electronic document. The application program may further displaying the received signature graphic in the first window, validate the received signature graphic against a digital signature object embedded in the electronic document, and display a second window for defining the display of a plurality of signature line properties for one or more signature lines displayed in the electronic document. The signature line properties may include signature data which may further include a name of the signer of the electronic document, a title of the signer of the electronic document, or an electronic mail address associated with the signer of the electronic document. The application program may further display, in the second window appearance options for displaying the signature graphic in the electronic document. The appearance options may include a first option for displaying the signature graphic over the signature line, a second option for displaying the signature graphic as a stamp compatible with an Eastern signature format, and a third option for displaying a date that the electronic document was signed. The application program may further display a third window for defining signature properties for the electronic document. The signature properties may include user-selectable selectable options including: a first option for signing the entire electronic document, a second option for signing one or more identified portions of the electronic document, a third option for co-signing multiple signature lines in the electronic document, and a fourth option for counter-signing multiple signatures lines in the electronic document. Referring now to the drawings, in which like numerals represent like elements, various illustrative embodiments will now be described.

FIG. 1 is a block diagram illustrating the interaction between various software components for generating a secure digitally signed electronic document having a natural signature (signature graphic), in accordance with various embodiments. The software components include an electronic document 60 which includes a signature graphic 62. As defined herein, the signature graphic 62 may include, without limitation, a handwritten signature (which may be received on a pen-based or tablet computing device) or a computer-based typewritten signature font. In accordance with various embodiments, the signature graphic may also be either in a Western signature format or an Eastern signature format. It will be appreciated that signatures in Western signature formats, such as those used in the United States, are typically generated by scribbling or typing a series of characters in a left to right manner while Eastern signature formats, such as those used in Japan, are typically generated using a picture graphic such as a Hanko stamp (colloquially known as a "chop").

The software components further include a hash calculation module 64 for generating a hash value 66 from the electronic document 60 and the signature graphic 62. As should be understood by those skilled in the art, a hash value may be an alphanumeric value generated by a formula from input data in such a way that it is extremely unlikely that some other input data will produce the same hash value. Various methods for generating hash values are well-known to those skilled in the art, and therefore are not discussed in further detail herein.

The software components further include cryptographic data 70 which includes private key data 72, public key data 74, and digital certificate data 76. As known to those skilled in the art, various cryptographic encryption methods allow for the encryption of data using a public key infrastructure ("PKI") for verifying and authenticating the validity of data. The PKI infrastructure may include a private key, a public key, and a digital certificate. In accordance with various embodiments, the private key data 72 may be utilized to encrypt the hash value 66 while the public key data 74 and the digital certificate data 76 may be added to the encrypted hash value 66 to create a digital signature object 78 which, as will be described in greater detail below in the discussion of FIGS. 2-3, may be used to verify and authenticate a digital signature against a signature graphic in an electronic document. The digital signature object 78 may also be embedded in the electronic document 60 as a cryptographic signature. It will be appreciate that the embedded digital signature object 78 and the signature graphic 62 form the digital signature for the electronic document 60.

Exemplary Operating Environment

Figure 2:
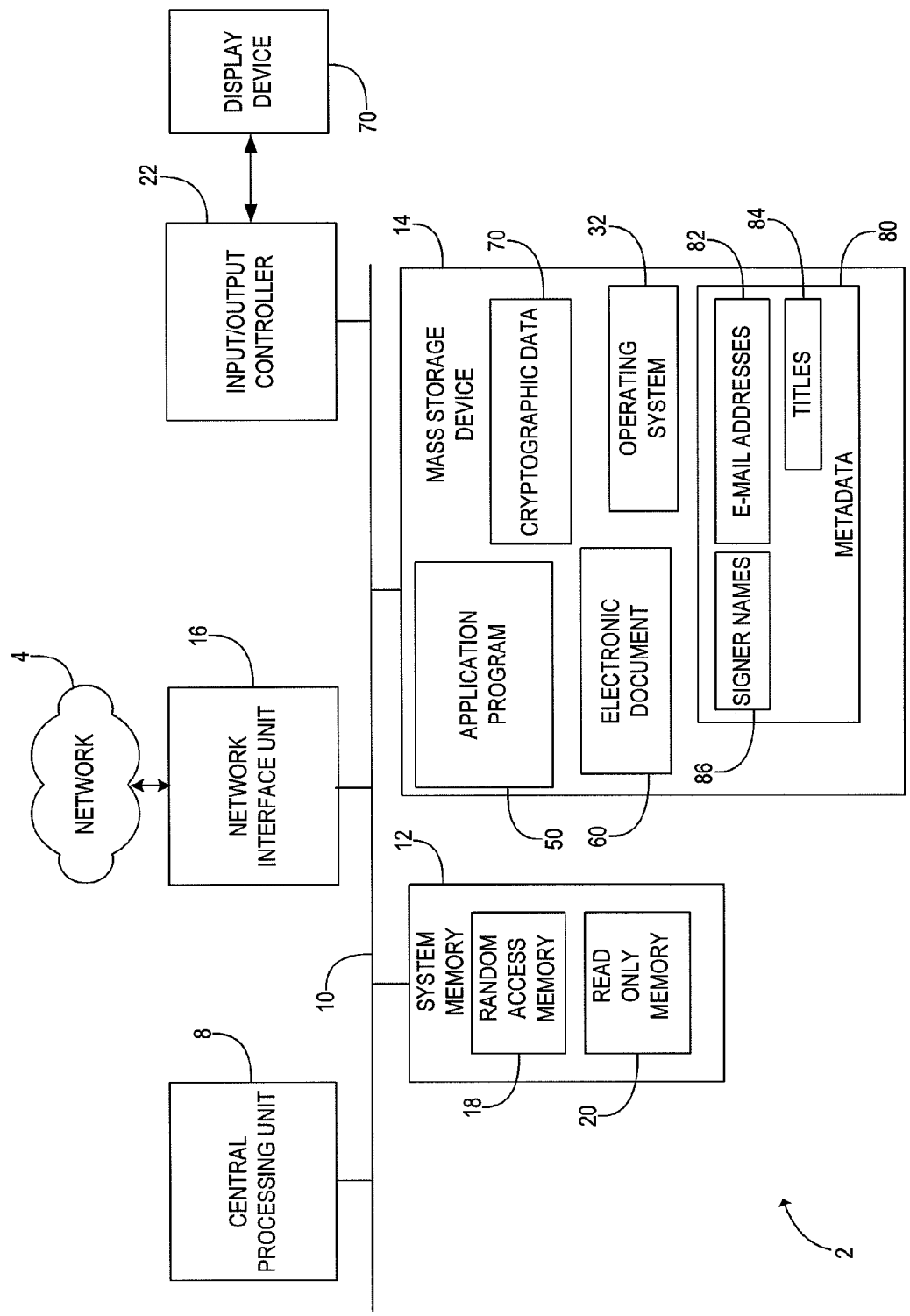
FIG. 2 is a block diagram illustrating a computing environment which may be utilized for the visualization and routing of digital signatures, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, an application program 50, the electronic document 60, the cryptographic data 70, and metadata 80. The metadata 80 may include e-mail addresses 82, titles 84, and signer names 86. As will be described in greater detail below, the metadata 80 may be used to facilitate the collection and routing of digital signatures in accordance with various embodiments.

In accordance with various embodiments, the operating system 32 may be suitable for controlling the operation of a networked personal computer, such as the WINDOWS operating systems from MICROSOFT CORPORATION of Redmond, Wash. The application program 50 may comprise various productivity application programs including, but not limited to, word processing application programs, spreadsheet application programs and information gathering programs which are used in the creation and routing (e.g., via electronic mail) electronic documents. In accordance with various embodiments (which will be described in greater detail in the discussion of FIGS. 2-13), the application program 50 may be utilized to securely generate and visualize digital signatures in an electronic document, collect multiple digital signatures in an electronic document for routing to individual signers, and display a user interface for generating and validating signature data for securely visualizing digital signatures in an electronic document.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared services platform such as the SHAREPOINT SERVER platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

Figure 3:
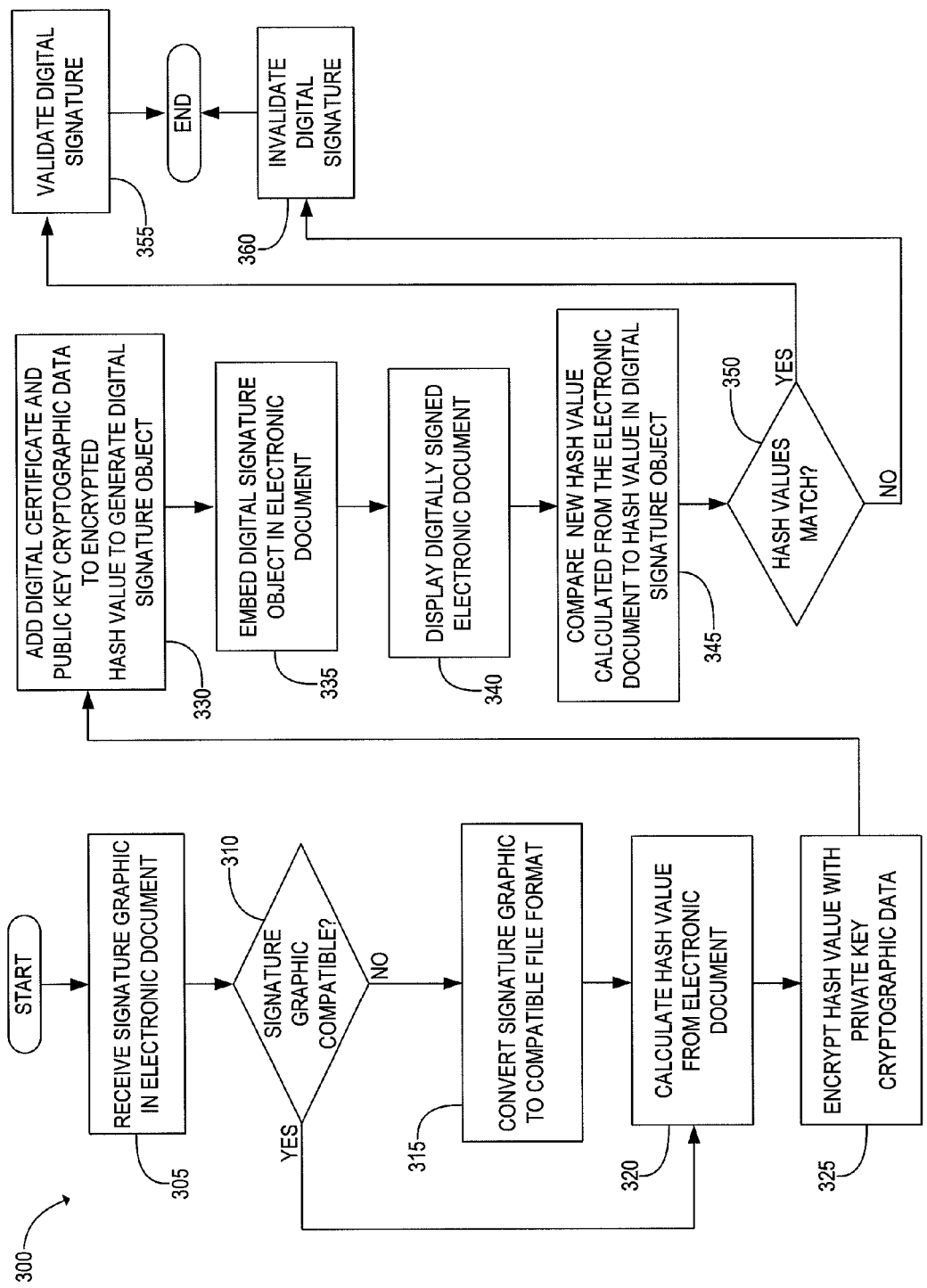
FIG. 3 is a flow diagram illustrating a routine for securely visualizing digital signatures in an electronic document generated by an application program, in accordance with one embodiment.

FIG. 3 is a flow diagram 3 illustrating a routine 300 for securely visualizing digital signatures in an electronic document generated by an application program, in accordance with an embodiment; When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the application program 50 executing on the computer 2 receives a signature graphic (such as the signature graphic 62 discussed above with respect to FIG. 1) in the electronic document 60. It should be understood that, in accordance with various embodiments, the application program 50 may be configured to allow a user to enter a signature graphic directly over a signature line already present in the electronic document or alternatively, generate a user interface for inserting one or more types of signature graphics in the electronic document 60. For example, a user of the application program 50 may directly write his or signature above a signature line in the electronic document 60 using a pen, stylus, or touchscreen input device connected to or integrated with a tablet computer. Alternatively, the user may use the user interface to enter a typewritten signature (e.g., in a signature font) or retrieve a previously stored image file comprising a signature stored on the computer 2 which may then be entered into the electronic document 60 as a signature graphic. An illustrative user interface for entering a signature in accordance with an embodiment is shown in FIG. 8 and will be discussed in greater detail below.

From operation 305, the routine 300 continues to operation 310, where the application program 50 determines whether the signature graphic entered into the electronic document 60 is in a compatible file format for the hash calculation module 64 (discussed above with respect to FIG. 1). For example, the hash calculation module 64 may be configured to receive a signature graphic as a Portable Network Graphics ("PNG") image file. If, at operation 310, the application program 50 determines that the signature graphic is not in a compatible file format, then the routine 300 continues to operation 315 where the application program 50 converts the signature graphic into a compatible file format for inputting into the hash calculation module 64. Various methods for converting images into different image file formats are well-known to those skilled in the art, and therefore are not discussed in further detail herein. From operation 315, the routine 300 continues to operation 320. If however, at operation 310, the application program 50 determines that the signature graphic is in a compatible file format, then the routine 300 branches from operation 310 to operation 320.

At operation 320, the application program 50 calculates a hash value from the electronic document 60 including the inserted signature graphic. For example, the application program 50 may configured with the hash calculation module 64 (discussed above with respect to FIG. 1) and may utilize the hash calculation module 64 to receive the electronic document 60 (including the signature graphic) as an input and calculate an alphanumeric hash value from the received input.

From operation 320, the routine 300 continues to operation 325 where the application program 50 encrypts the hash value with private key cryptographic data, such as the private key data 72 discussed above with respect to FIG. 1.

From operation 325, the routine 300 continues to operation 330 where the application program 50 adds digital certificate and public key cryptographic data (such as the digital certificate data 78 and the public key data 76 discussed above with respect to FIG. 1) to the encrypted hash value generated at operation 325 in order to generate a digital signature object (such as the digital signature object 78 discussed above with respect to FIG. 1).

From operation 330, the routine 300 continues to operation 335 where the application program 50 embeds the digital signature object into the electronic document 60. It will be appreciated that the digital signature object may be embedded into the electronic document 60 as hidden program code which is not seen by a user viewing the electronic document 60. As discussed above in the description of FIG. 1, the digital signature object may represent a cryptographic signature which is paired along with the currently displayed signature graphic in the electronic document to create a cryptographically secure digital signature.

From operation 335, the routine 300 continues to operation 340 where the application program 50 displays the digitally signed electronic document 60 to a user.

From operation 340, the routine 300 continues to operation 345 where the application program 50 verifies or validates the digital signature by comparing a new or subsequent hash value calculated from the electronic document 60 to the hash value used in the digital signature object generated at operation 330. In particular, the application program 50 may be utilized to determine if the signature graphic in the electronic document 60 has been modified and if so, use a hash value calculated from the modified signature graphic invalidate the digitally signed document.

From operation 345, the routine 300 continues to operation 350, where the application program 50 determines whether a hash value calculated from a currently displayed signature graphic in the electronic document 60 matches a previously calculated hash value used in determining the digital signature object currently embedded in the electronic document 60. In particular, the application program 50 may be configured to utilize the unencrypted hash value used to create the digital signature object and compare that value to a hash value generated from a currently displayed signature graphic in the electronic document 60. If, at operation 350, the application program 50 determines that the hash values match, then the routine 300 continues to operation 355 where the application program 50 validates the digital signature as authentic (i.e., the signature graphic currently displayed in the electronic document 60 is the same as the signature graphic utilized in generating the digital signature object). If however, at operation 350, the application program 50 determines that the hash values do not match, then the routine 300 branches from operation 350 to operation 360.

Figure 9:
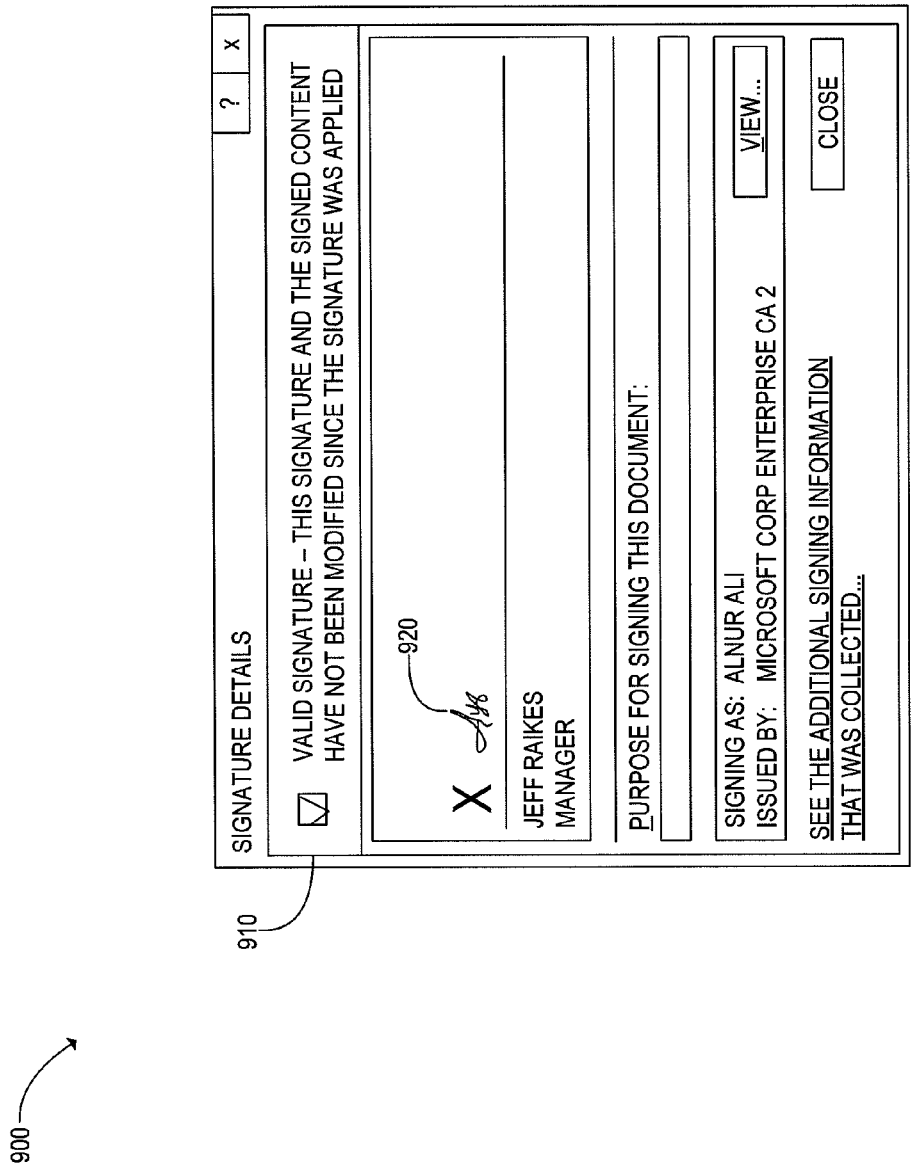
FIG. 9 is a computer screen display of a user interface which may be utilized to validate a digital signature in an electronic document, in accordance with an embodiment.
Figure 10:
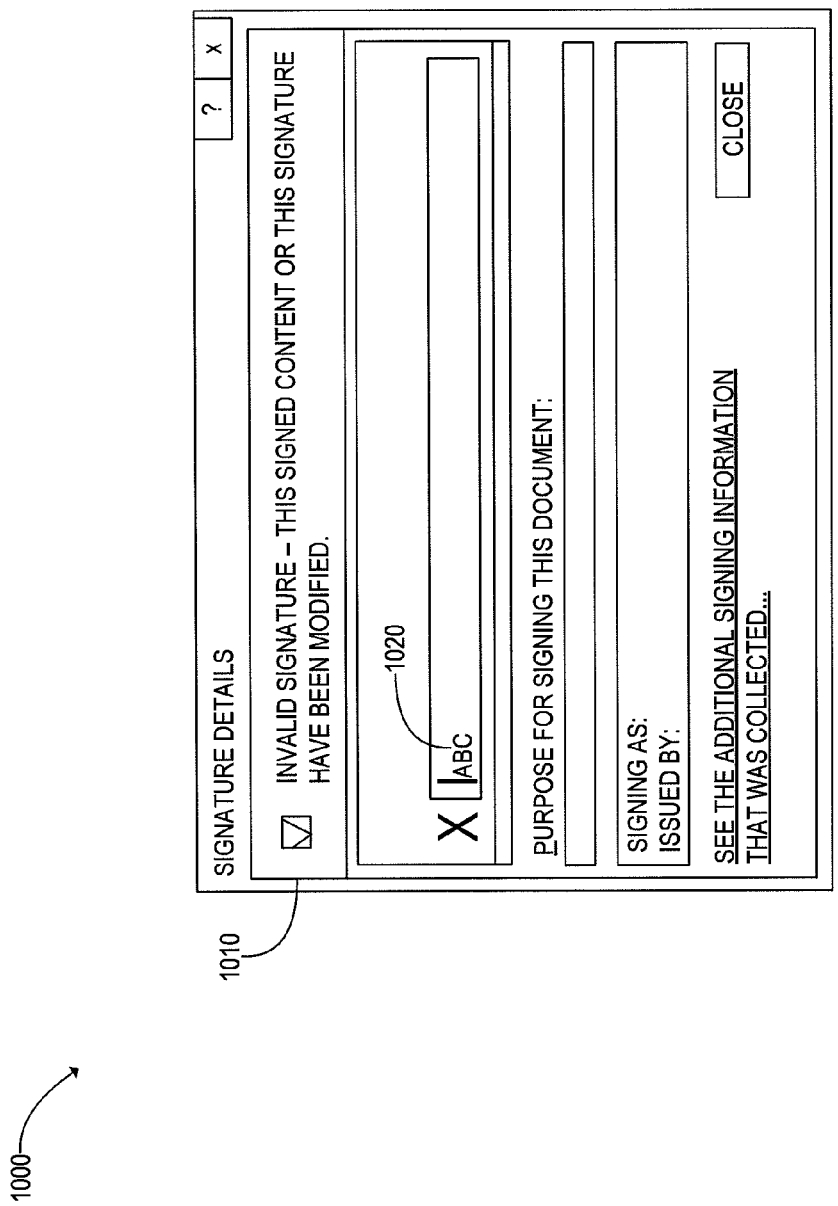
FIG. 10 is a computer screen display of a user interface which may be utilized to invalidate a digital signature in an electronic document, in accordance with an embodiment.

At operation 360, the application program 50 invalidates the digital signature as having been modified. It will be appreciated that a digital signature may be modified when a user modifies or changes a signature graphic utilized to generate the digital signature object or cryptographic signature in an electronic document. For example, if a signer subsequent to the original signer of the digitally signed electronic document 60 modifies the signature graphic displayed in the document in an effort to pose as the original signer (e.g., by replacing the original signature graphic with the subsequent user's signature graphic), the calculated hash value for the modified signature graphic will be different than that calculated for the original signer. As a result, the hash values will not match and the digital signature for the document will be invalidated. In accordance with an embodiment, the application program 50 may be configured to generate a user interface for displaying to a user whether or not a digitally signed document is valid. An illustrative user interface showing a successful validation of a digital signature is shown in FIG. 9 and will be discussed in greater detail below. Similarly, an illustrative user interface showing an invalidation of a digital signature is shown in FIG. 10 which will also be discussed in greater detail below. From operations 355 and 360, the routine 300 then ends.

Figure 4:
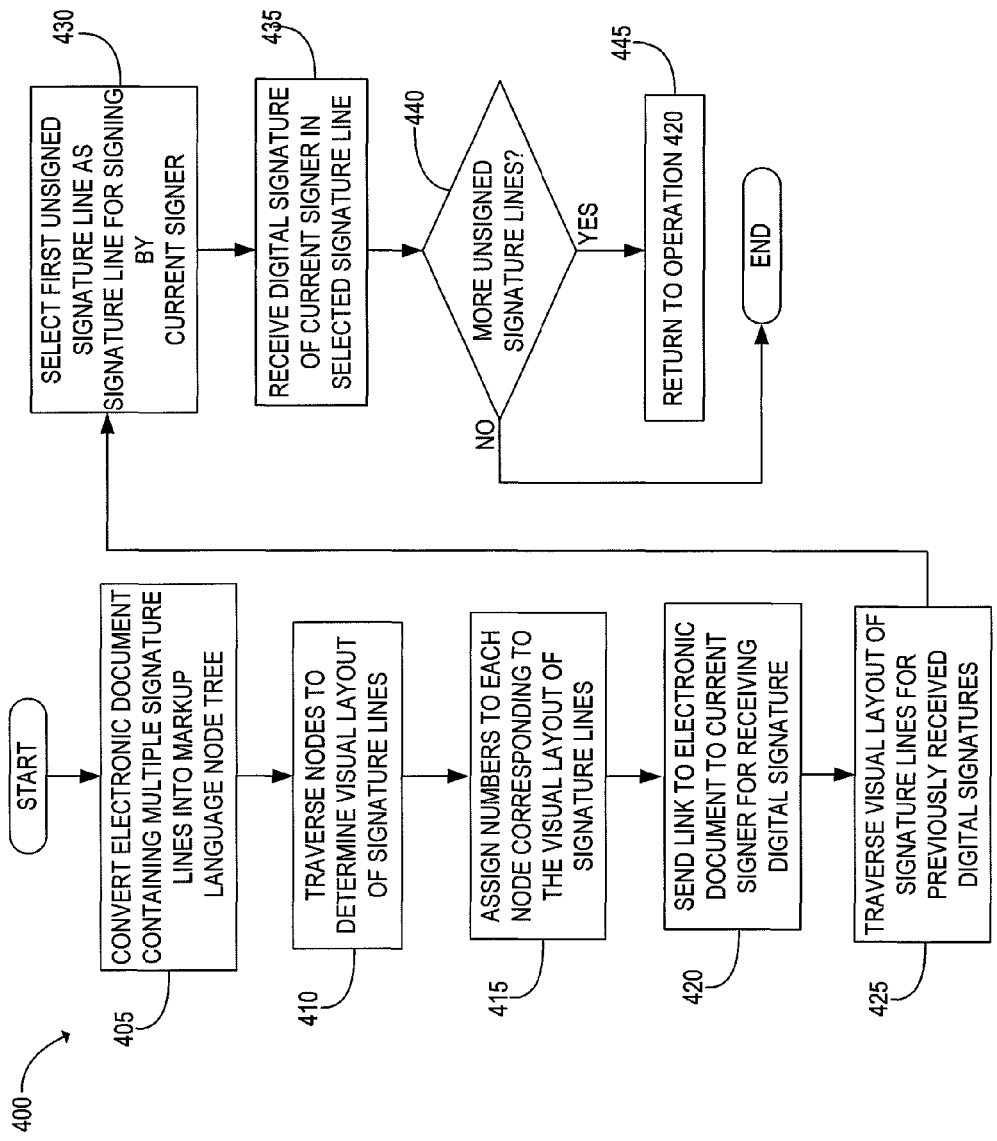
FIG. 4 is a flow diagram illustrating a routine for collecting digital signatures for routing through an application program executing on a computer system, in accordance with an embodiment.
Figure 6:
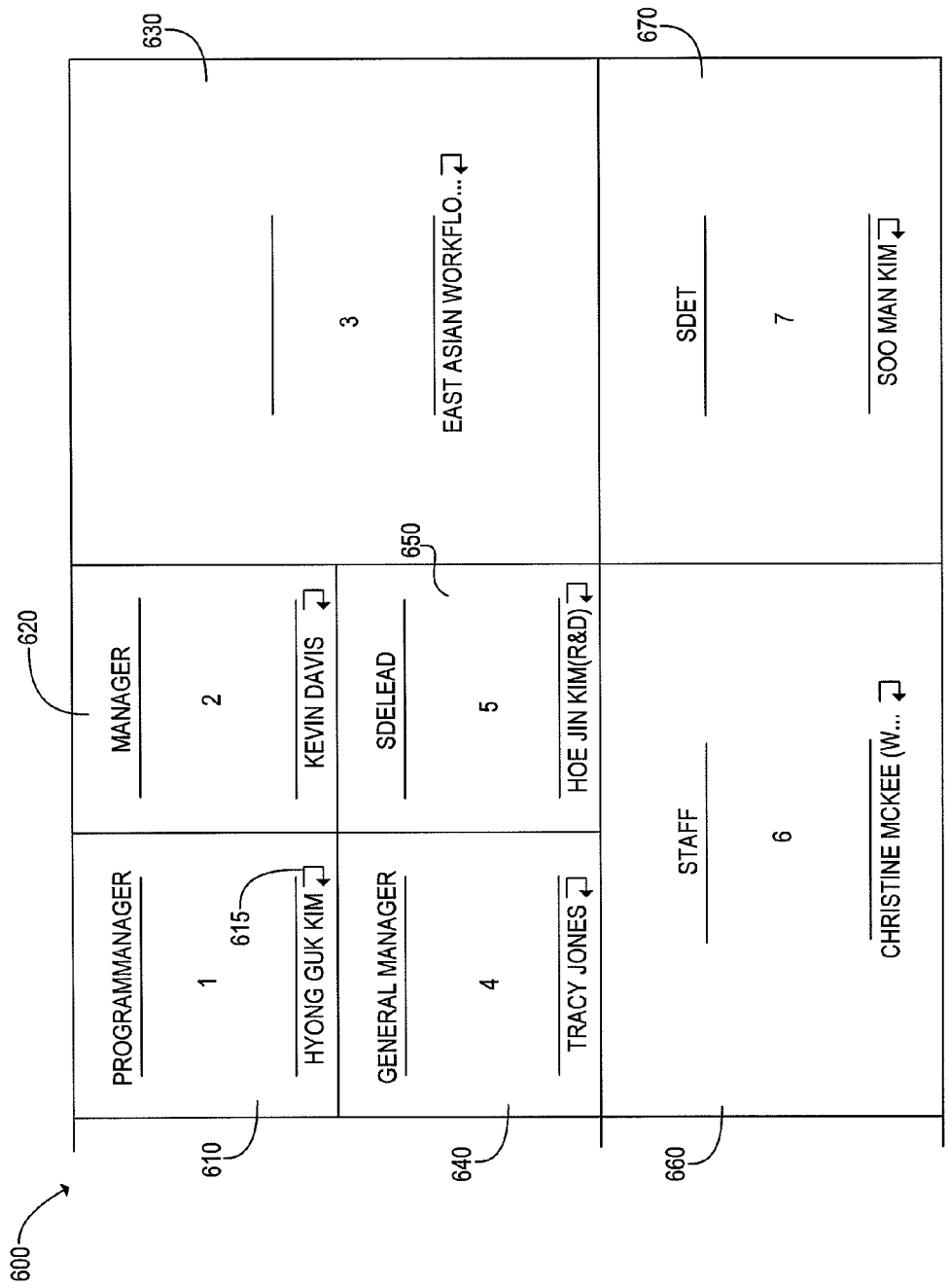
FIG. 6 is a computer screen display of an electronic document which may be utilized for collecting digital signatures in an electronic document, in accordance with an embodiment.
Figure 7:
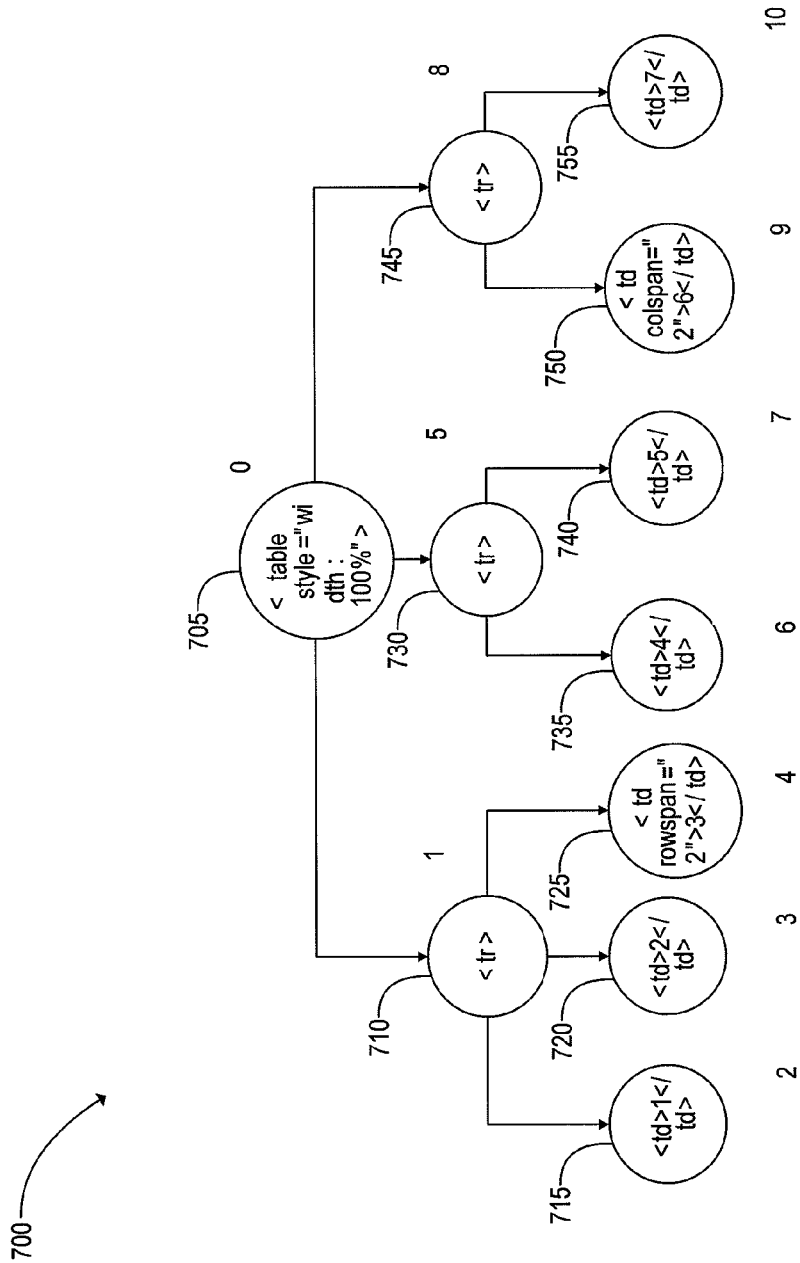
FIG. 7 is a tree diagram illustrating a visual layout of an electronic document which is utilized to specify signature lines for receiving digital signatures from multiple signers during the collection of digital signatures in the electronic document, in accordance with an embodiment.

FIG. 4 is a flow diagram illustrating a routine 400 for collecting digital signatures for routing through an application program executing on a computer system, in accordance with an embodiment. The routine 400 begins at operation 405, where the application program 50 executing on the computer 2 converts an electronic document (e.g., the electronic document 600 shown in FIG. 6) containing multiple signature lines into a markup language node tree. An illustrative computer screen display illustrating an electronic document with multiple signature lines is shown in FIG. 6 and will be discussed in greater detail below. An illustrative markup language node tree is shown in FIG. 7 which will also be discussed in greater detail below. In particular, the application program 50 may be configured to convert the electronic document into one of a number of markup language formats including, but not limited to, the hypertext markup language ("HTML") and the extensible markup language ("XML") formats. Once the electronic document has been converted into a markup language format, the application program 50 may organize the converted markup language into a node tree. For example, and as will be understood by those skilled in the art, various markup languages including HTML and XML comprise nodes which by definition conform to a tree structure. In accordance with an embodiment, the application program 50 may be configured to map the visual layout of the electronic document into a tree layout of nodes that may be traversed using graph-theoretic methods. As will be discussed in greater detail herein, the tree layout may be utilized to determine an order for collecting digital signatures in an electronic document.

From operation 405, the routine 400 continues to operation 410, where the application program 50 traverses the nodes in the node tree to determine a visual layout of the signature lines in the electronic document. In particular, the application program 50 may be configured to perform a pre-order traversal of the node tree which may include a visual left-to-right traversal or a right-to-left traversal. As will be understood by those skilled in the art, in accordance with one embodiment, the pre-order traversal may be performed by accessing an HTML document object model ("DOM"). It will further be understood that the pre-order traversal may be the same as a depth-first search of a DOM except that the search doesn't terminate until the entire tree is examined.

From operation 410, the routine 400 continues to operation 415, where the application program 50 assigns a number to each node corresponding to the visual layout of the signature lines in the electronic document. In particular, as the node tree is traversed, the application program 50 may keep a count of the order in which each node (corresponding to a signature line) is visually displayed. It should be understood that in accordance with various embodiments, the operations 405-415 discussed above may be performed as the electronic document is being authored but prior to any signatures being received.

From operation 415, the routine 400 continues to operation 420 where the application program 50 sends a link to the electronic document to a current signer in the electronic document for receiving a digital signature. In particular, the application program 50 may be configured to collect signatures for the electronic document by e-mailing a uniform resource locator ("URL") for accessing the electronic document to each signer, one signer at a time, who has not yet digitally signed the electronic document (i.e., the current signer) in the order determined in operation 415.

From operation 420, the routine 400 continues to operation 425 where the application program 50 traverses the visual layout of signature lines in the node tree for previously received digital signatures in order to determine a correct signature line for receiving a digital signature for the current signer.

From operation 425, the routine 400 continues to operation 430 where the application program 50 selects the first unsigned signature line in the electronic document as the signature line for digitally signing by the current signer. In particular, the application program 50 may be configured to display a visual indicator (such as an icon) in the electronic document to identify the selected signature line for the receiving the digital signature of the current signer.

From operation 430, the routine 400 continues to operation 435 where the application program 50 receives the digital signature of the current signer. In accordance with various embodiments, the digital signature may be received using the routine 300 described above with respect to FIG. 3.

From operation 435, the routine 400 continues to operation 440 where the application program 50 determines if more unsigned signature lines are present in the electronic document. If, at operation 440, the application program determines that more signature lines in the electronic document remain unsigned, then the routine 400 continues to operation 445 where the routine 400 returns to operation 420 where the link to the electronic document is sent to the next signer identified by the next or higher numbered signature line in the visual layout of signature lines in the node tree as compared to the previously signed signature line in the electronic document. If however, at operation 440, the application program 50 determines that all of the signature lines in the electronic document have been signed, then the routine 400 then ends.

Figure 5:
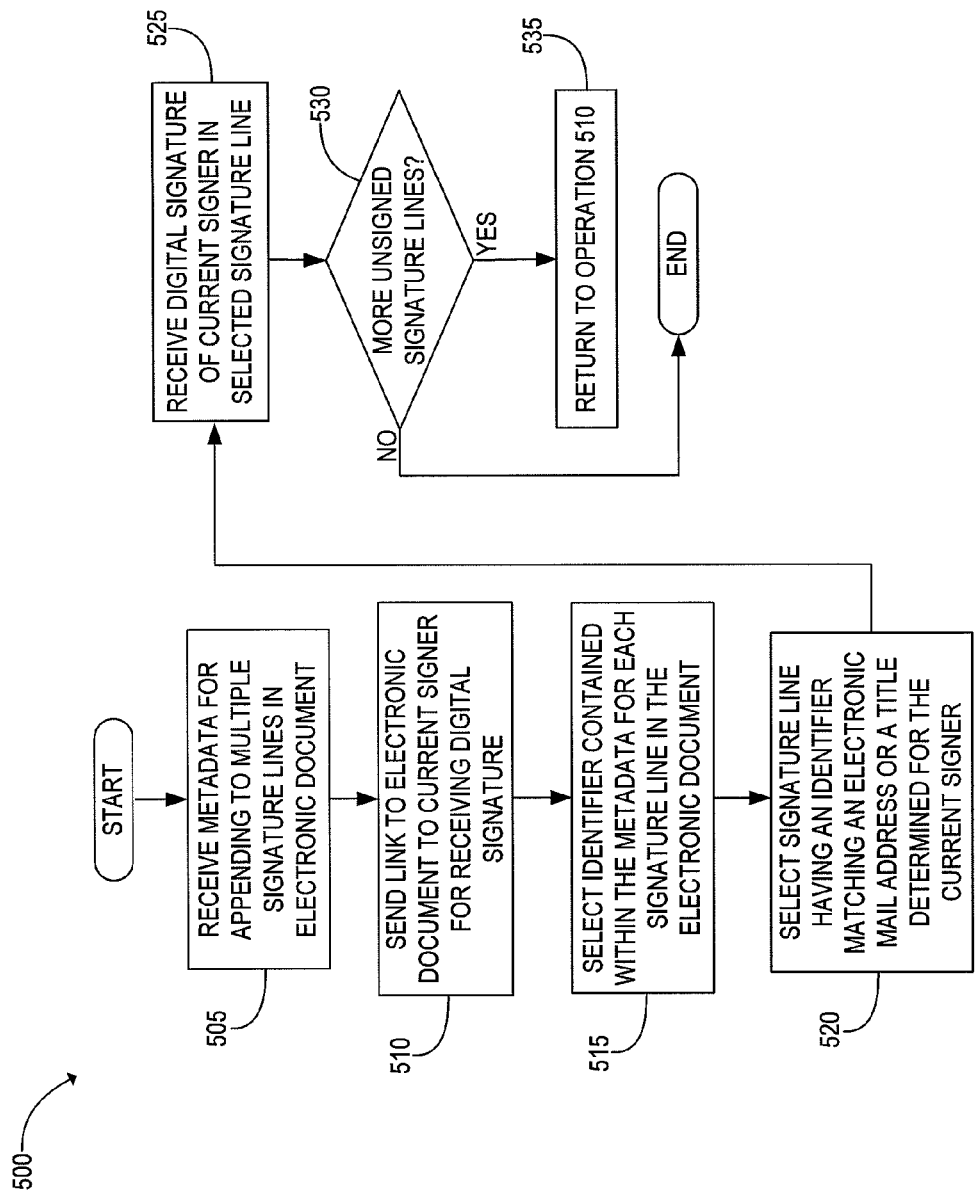
FIG. 5 is a flow diagram illustrating a routine for collecting digital signatures for routing through an application program executing on a computer system, in accordance with an alternative embodiment.

FIG. 5 is a flow diagram illustrating a routine 500 for collecting digital signatures for routing through an application program executing on a computer system, in accordance with an alternative embodiment. The routine 500 begins at operation 505, where the application program 50 executing on the computer 2 receives metadata (such as the metadata 80 discussed with respect to FIG. 2) for appending to multiple signature lines in an electronic document (e.g., the electronic document 600 shown in FIG. 6). In particular, the application program 50 may be configured to append the metadata 80 to specify the intended signer name, e-mail address, and title for each signature line in an electronic document generated to collect signatures from multiple signers. As will be described in greater detail below, the metadata 80 may also be utilized to infer a signature line (i.e., position inference) for each signer to sign upon receiving the electronic document. It should be understood that in accordance with various embodiments, the operation 505 discussed above may be performed as the electronic document is being authored but prior to any signatures being received.

From operation 505, the routine 500 continues to operation 510, where the application program 50 sends a link to the electronic document to a current signer in the electronic document for receiving a digital signature. In particular, the application program 50 may be configured to collect signatures for the electronic document by e-mailing a uniform resource locator ("URL") for accessing the electronic document to each signer, one signer at a time, who has not yet digitally signed the electronic document (i.e., the current signer is the recipient of the link to the electronic document).

From operation 510, the routine 500 continues to operation 515 where the application program 50 selects an identifier contained within the metadata 80 for each signature line in the electronic document. In particular, the application program 50 may be configured to select or retrieve e-mail addresses 82, titles 84, and signer names 86 from the metadata 80 shown in FIG. 2.

From operation 515, the routine 500 continues to operation 520 where the application program 50 selects a signature line having an identifier matching an e-mail address or a title determined for the current signer (i.e., the signer receiving the link to the electronic document at operation 510). In particular, in accordance with an embodiment, the application program 50 may be configured to compare the e-mail address used to send the link to the electronic document for receiving a digital signature to an e-mail address in the e-mail addresses 82 metadata for each of the signature lines in the electronic document. The signature line in the electronic document which matches the e-mail address of the current signer may be selected as the signature line for receiving the digital signature. In accordance with another embodiment, the application program 50 may be configured to select a signature line based on an organizational hierarchy by using the titles 84 metadata. In particular, the application program 50 may be configured to compare the title (e.g., general manager, program manager, etc.) of the current signer to the titles in the titles 84 metadata appended to the signature lines in the electronic document. The signature line which matches the current signer's title may then be selected as the signature line for receiving the digital signature of the current signer. In accordance with an embodiment, the title for the current signer may be obtained by accessing a network directory lookup service such as the ACTIVE DIRECTORY directory service from Microsoft Corporation of Redmond, Wash. For example, a user identification (e.g., the current signer's initials) for the current signer for using the application program 50 on the computer 2 may be utilized by the application program 50 to access directory service information about the current signer including the current signer's title in an organizational hierarchy. It will be appreciated that by selecting a signature line based on the titles 84 metadata, the electronic document may be authored with signature lines which do not specify any signer names. In accordance with yet another embodiment, the application program 50 may be configured to select a signature line based on the current signer's name using the signer names 86 metadata. In particular, the application program 50 may be configured to convert the singer names 86 metadata appended to the signature lines e-mail addresses using the network directory lookup service. The application program 50 may then select the signature line in the electronic document which matches the e-mail address used to send the link to the electronic document to the current signer. In accordance with various embodiments, the signature line may be identified to the current signer by configuring the application program 50 to display a visual indicator (such as an icon) in the electronic document to identify the selected signature line for the receiving the digital signature of the current signer.

From operation 520, the routine 500 continues to operation 525 where the application program 50 receives the digital signature of the current signer. In accordance with various embodiments, the digital signature may be received using the routine 300 described above with respect to FIG. 3.

From operation 525, the routine 500 continues to operation 530 where the application program 50 determines if more unsigned signature lines are present in the electronic document. If, at operation 530, the application program determines that more signature lines in the electronic document remain unsigned, then the routine 500 continues to operation 535 where the routine 500 returns to operation 510 where the link to the electronic document is sent to another signer. If however, at operation 530, the application program 50 determines that all of the signature lines in the electronic document have been signed, then the routine 500 then ends.

FIG. 6 is a computer screen display of an electronic document 600 generated by the application program 50 which may be utilized for collecting digital signatures, in accordance with an embodiment. The electronic document 600 includes signature sections 610, 620, 630, 640, 650, 660, and 670 for collecting multiple digital signatures. Each of the signature sections 610, 620, 640, 650, 660, and 670 displays a title for the intended signer, a signature line, and an intended signer name. The signature section 630 displays a signature line for receiving a signature in an Eastern signature format (such as a Hanko stamp). It should be understood that in accordance with alternative embodiments, the signature sections 610, 620, 640, 650, 660, and 670 may only display a title for each intended signer without displaying the intended signer name. In these embodiments, digital signatures may be collected from the intended signers by using an organizational hierarchy as discussed above with respect to operation 520 of FIG. 5. The electronic document 600 also displays a user control 615. In accordance with various embodiments, the user control 615 may be selected by a signer to open a user interface to enter a signature graphic to be displayed on a signature line and to further digitally sign the electronic document. An illustrative user interface for signing the electronic document 600 is shown in FIG. 8 which will be discussed in greater detail below.

FIG. 7 is a tree diagram 700 illustrating a visual layout of an electronic document which is utilized to specify signature lines for receiving digital signatures from multiple signers during the collection of digital signatures in the electronic document, in accordance with an embodiment. As discussed above in the discussion of FIG. 4, the application program 50 may be configured to convert an electronic document (e.g., the electronic document 600 shown in FIG. 6) containing multiple signature lines into markup language according to a markup language format (e.g., HTML or XML). The markup language may then be organized into the tree diagram 700 by the application program 50. For example, the electronic document 600 may be converted into HTML as shown below:

```
<table style="width: 100%">
    <tr>
        <td>1</td>
        <td>2</td>
        <td rowspan="2">3</td>
    </tr>
    <tr>
        <td>4</td>
        <td>5</td>
    </tr>
    <tr>
        <td colspan="2">6</td>
        <td>7</td>
    </tr>
</table>
```

The tree diagram 700 consists of nodes 705, 710, 715, 720, 725, 730, 735, 740, 745, 750, and 755, each of which is mapped to the HTML code shown above. The tree diagram 700 provides a visual layout of the electronic document 600 that may be traversed using graph-theoretic methods and may be utilized to determine an order for collecting digital signatures as discussed above with respect to FIG. 4.

FIG. 8 is a computer screen display of a user interface 800, generated by the application program 50, which may be utilized to receive a signature graphic for digitally signing an electronic document, in accordance with an embodiment. The user interface 800 includes a signature box 810 for a signer to type in a signature to be used as the signature graphic. The user interface 800 also includes a user control 820 for a signer to retrieve a previously stored image file to be used as the signature graphic. The user interface 800 also includes a Sign button 830 for digitally signing an electronic document using the selected signature graphic.

FIG. 9 is a computer screen display of a user interface 900, generated by the application program 50, which may be utilized to validate a digital signature in an electronic document, in accordance with an embodiment. The user interface 900 displays a validation message 910 for a signature graphic 910 which has been applied to an electronic document for digitally signing the electronic document. In accordance with an embodiment, the user interface 900 displaying the validation message 910 may be generated by the application program 50 upon the completion of the validation operation 355 discussed above with respect to FIG. 3.

FIG. 10 is a computer screen display of a user interface 1000, generated by the application program 50, which may be utilized to invalidate a digital signature in an electronic document, in accordance with an embodiment. The user interface 1000 displays a validation message 1010 for a signature graphic which has been applied to an electronic document for digitally signing the electronic document. In accordance with an embodiment, the user interface 1000 displaying the validation message 1010 may be generated by the application program 50 upon the completion of the invalidation operation 360 discussed above with respect to FIG. 3.

Figure 11:
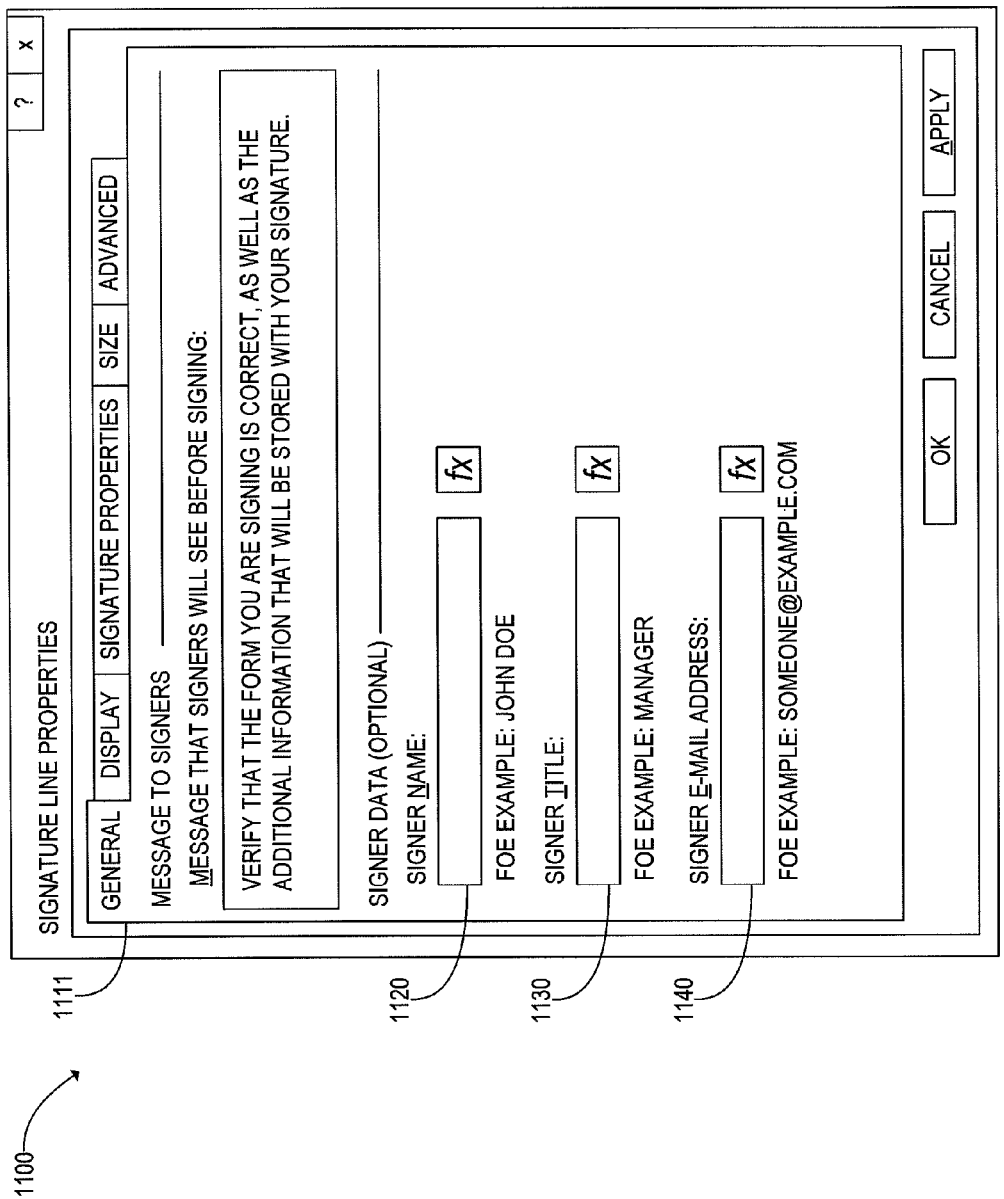
FIG. 11 is a computer screen display of a user interface which may be utilized to receive signature line properties which may be utilized in the collection and routing of digital signatures, in accordance with an embodiment.

FIG. 11 is a computer screen display of a user interface 1100, generated by the application program 50, which may be utilized to receive signature line properties which may be utilized in the collection and routing of digital signatures, in accordance with an embodiment. The user interface 100 includes a General tab 1111, and input boxes 1120, 1130, and 1140 for receiving a Singer name, a Signer title, and a Signer e-mail address. The input boxes 1120, 1130, and 1140 may be utilized by the author of an electronic document to create the metadata 80 which is appended to signature lines to specify the intended signer name, e-mail address, and title for each signature line in the electronic document. As discussed above with respect to FIG. 5, the metadata 80 may be utilized to infer a signature line (i.e., position inference) for each signer to sign upon receiving the electronic document.

Figure 12:
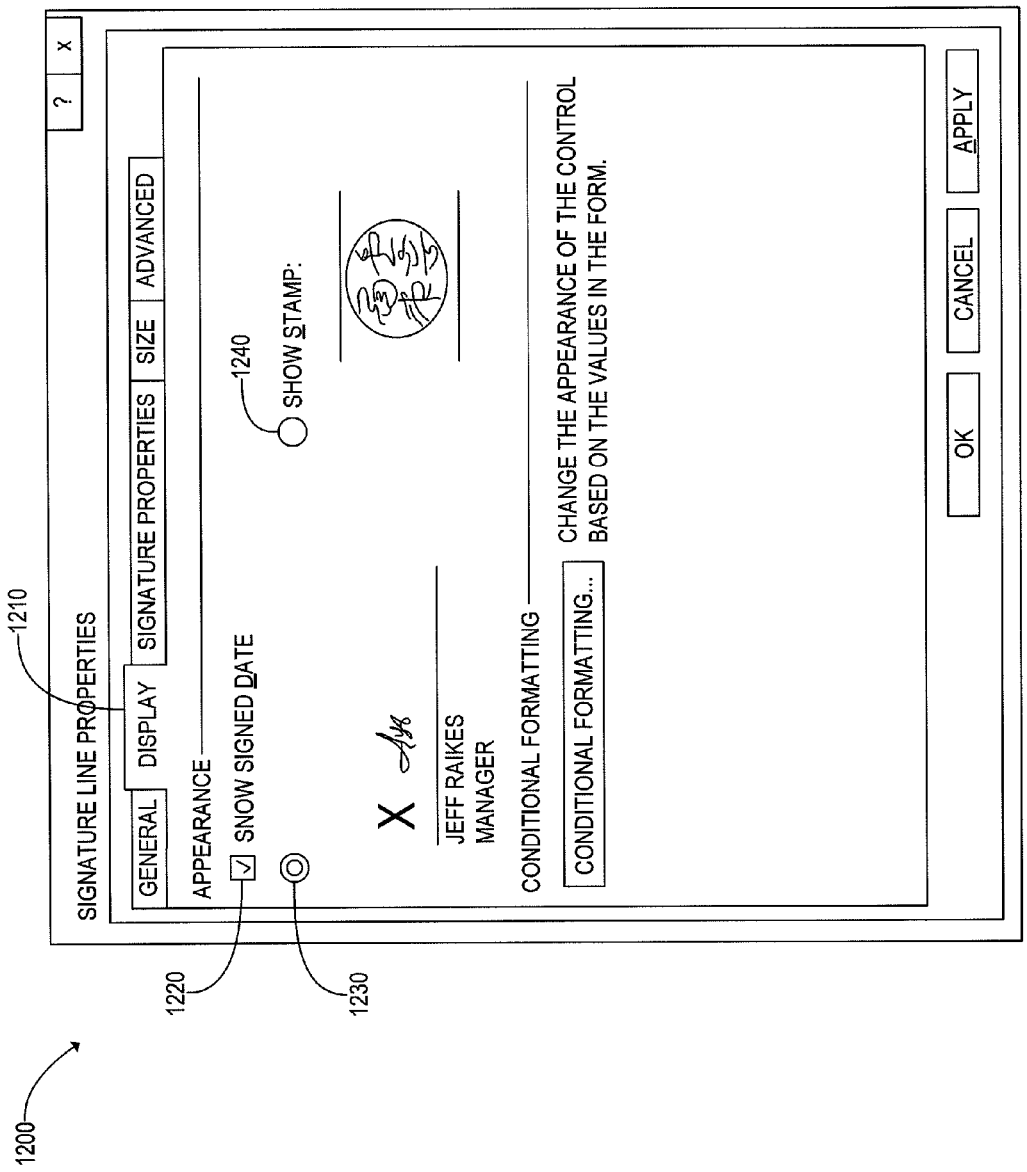
FIG. 12 is a computer screen display of a user interface which may be utilized to define the appearance of a digital signature in an electronic document, in accordance with an embodiment.

FIG. 12 is a computer screen display of a user interface 1200, generated by the application program 50, which may be utilized to define the appearance of a digital signature in an electronic document, in accordance with an embodiment. The user interface 1200 includes a Display tab 1210, an Appearance checkbox 1120 for showing a signed date, an Appearance radio or option button 1230 for showing a signature line, and an Appearance radio or option button 1240 for showing a stamp for signing an electronic document in an Eastern signature format.

Figure 13:
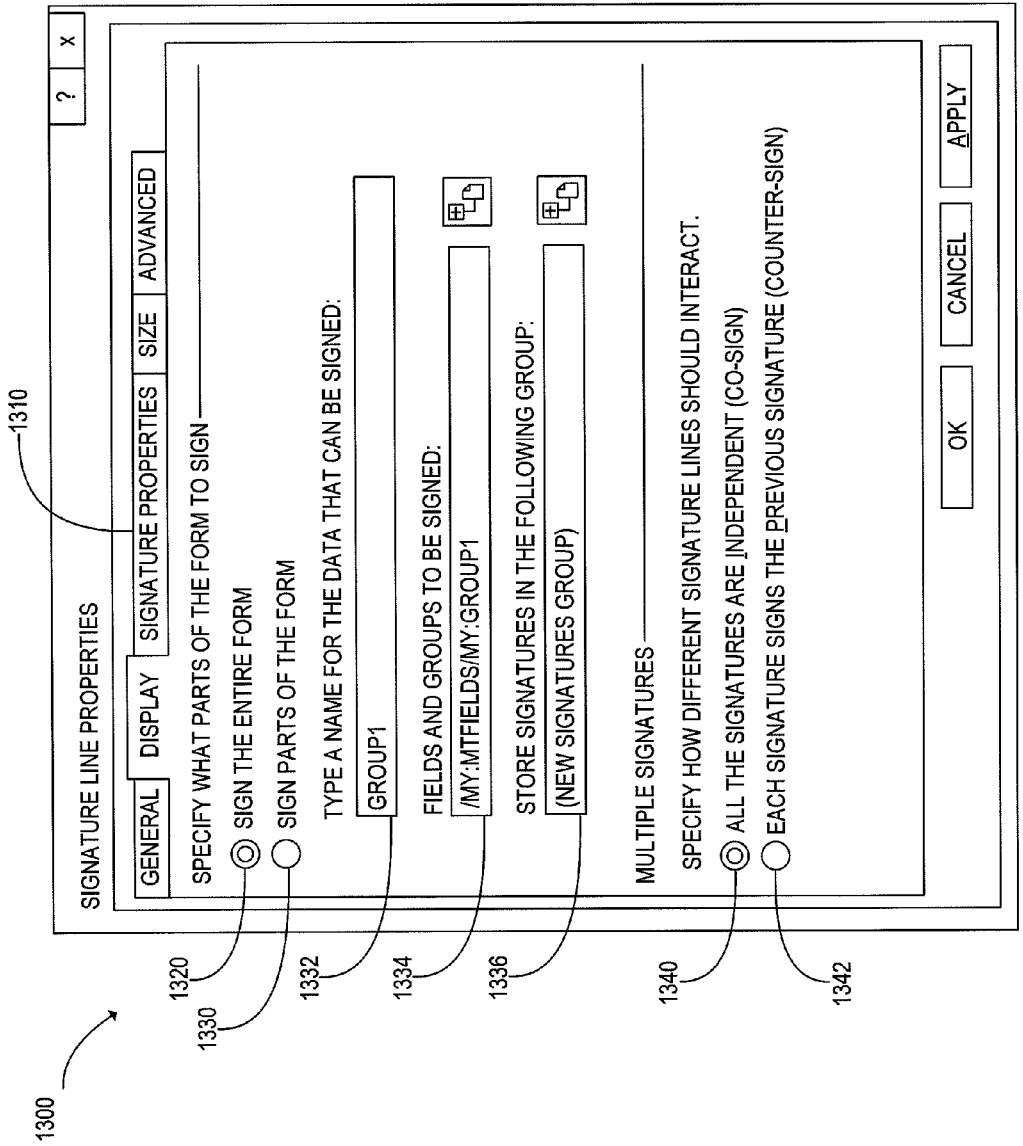
FIG. 13 is a computer screen display of a user interface which may be utilized to specify portions of an electronic document for receiving digital signatures and to specify the interaction between multiple digital signatures in an electronic document, in accordance with an embodiment.

FIG. 13 is a computer screen display of a user interface 1300, generated by the application program 50, which may be utilized to specify portions of an electronic document for receiving digital signatures and to specify the interaction between multiple digital signatures in an electronic document, in accordance with an embodiment. The user interface 1300 includes a Signature properties tab 1310 and radio or option buttons 1320 and 1330 which may be selected to specify signing an entire electronic document (e.g., a form) or signing parts of the electronic document. The user interface 1300 further includes input boxes 1332, 1334, and 1336 which may be utilized to specify the parts of the electronic document to be signed. In particular, the input box 1332 may be utilized to type in a name for the data that can be signed, the input box 1334 may be utilized to specify fields and groups in the electronic document to be signed, and input box 1336 may be utilized to specify a group for storing digital signatures. The user interface 1300 further includes radio or option buttons 1340 and 1342 which may be selected to specify how multiple digital signatures received in an electronic document may interact. In particular, the radio or option button 1340 may be selected to specify that all of the digital signatures are independent of one another (i.e., a co-signing arrangement) while the radio or option button 1342 may be selected to specify that each digital signature sings the previous digital signature (i.e., a counter-signing arrangement).

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for collecting digital signatures for routing through an application program executing on a computer system, comprising:
   converting an electronic document generated by the application program into a tree comprising a plurality of markup language nodes, wherein each markup language node corresponds to one of a plurality of signature lines, and wherein the tree represents a visual layout of the plurality of signature lines in the electronic document;
   traversing the markup language nodes to determine a visual order of each of the plurality of signature lines;
   assigning a number to each of the plurality of markup language nodes corresponding to the visual order;
   sending a link to the electronic document to a current signer identified by an unsigned signature line among the plurality of signature lines for receiving a current digital signature;
   automatically selecting, based at least in part on the visual order, the unsigned signature line for receiving the current digital signature from the current signer;
   receiving the current digital signature of the current signer in the selected unsigned signature line, wherein the current digital signature is incorporated into the electronic document; and
   upon receiving the current digital signature of the current signer, sending the link to the electronic document including the current digital signature to at least one subsequent signer identified by at least one subsequent unsigned signature line of the plurality of signature lines in the electronic document until digital signatures have been received for each of the plurality of signature lines.

2. The method of claim 1 further comprising, prior to sending the link to the electronic document, receiving metadata for appending to each of the plurality of signature lines in the electronic document, the metadata comprising one or more of the following identifiers: a signer name, an electronic mail address of the signer, and a title of the signer.

3. The method of claim 2, wherein automatically selecting the unsigned signature line for receiving the current digital signature from the current signer comprises:
   selecting an identifier contained within the metadata for each of the plurality of signature lines in the electronic document; and
   selecting a signature line from among the plurality of signature lines having an identifier which matches at least one of an electronic mail address or a title determined for the current signer as the unsigned signature line for receiving the current digital signature from the current signer.

4. The method of claim 1, wherein assigning a number to each of the plurality of markup language nodes corresponding to the visual order comprises assigning each number to the plurality of markup language nodes in at least one of a left-to-right visual order and a right-to-left visual order.

5. The method of claim 1, wherein automatically selecting the unsigned signature line for receiving the current digital signature from the current signer comprises:
   traversing the visual layout of the plurality of signature lines in the electronic document for previously received digital signatures; and
   selecting the first unsigned signature line as the unsigned signature line for receiving the current digital signature from the current signer.

6. A computer system, comprising:
   at least one processing unit; and
   at least one memory storing computer-executable instructions that when executed by the at least one processing unit cause the computing system to:
   convert an electronic document generated by the application program into a tree comprising a plurality of markup language nodes, wherein each markup language node corresponds to one of a plurality of signature lines, and wherein the tree represents a visual layout of the plurality of signature lines in the electronic document;
   traverse the markup language nodes to determine a visual order of each of the plurality of signature lines;
   send a link to the electronic document to a current signer identified by an unsigned signature line among the plurality of signature lines for receiving a current digital signature;
   automatically select, based at least in part on the visual order, the unsigned signature line for receiving the current digital signature from the current signer;
   receive the current digital signature of the current signer in the selected unsigned signature line;
   incorporate the current digital signature into the electronic document; and
   send the link to the electronic document including the current digital signature to at least one subsequent signer identified by at least one subsequent unsigned signature line of the plurality of signature lines in the electronic document until digital signatures have been received for each of the plurality of signature lines.

7. The computer system of claim 6, the computer-executable instructions further causing the computer system to:
   prior to sending the link to the electronic document, receive metadata for appending to each of the plurality of signature lines in the electronic document, the metadata comprising one or more of the following identifiers: a signer name, an electronic mail address of the signer, and a title of the signer.

8. The computer system of claim 7, wherein automatically selecting the unsigned signature line for receiving the current digital signature from the current signer comprises:
   selecting an identifier contained within the metadata for each of the plurality of signature lines in the electronic document; and
   selecting a signature line from among the plurality of signature lines having an identifier which matches at least one of an electronic mail address or a title determined for the current signer as the unsigned signature line for receiving the current digital signature from the current signer.

9. The computer system of claim 6, further comprising:
assigning a number to each of the plurality of markup language nodes corresponding to the visual order.

10. The computer system of claim 9, wherein assigning a number to each of the plurality of markup language nodes corresponding to the visual order comprises assigning each number to the plurality of markup language nodes in at least one of a left-to-right visual order and a right-to-left visual order.

11. The computer system of claim 6, wherein automatically selecting the unsigned signature line for receiving the current digital signature from the current signer comprises:
traversing the visual layout of the plurality of signature lines in the electronic document for previously received digital signatures; and
selecting the first unsigned signature line as the unsigned signature line for receiving the current digital signature from the current signer.

12. The computer system of claim 6, wherein the current digital signature is a signature graphic.

13. The computer system of claim 12, wherein incorporating the current digital signature into the electronic document comprises embedding the signature graphic into the electronic document.

14. A computer-readable storage device storing computer-executable instructions that when executed by at least one processing unit cause the at least one processing unit to:
convert an electronic document generated by the application program into a tree comprising a plurality of markup language nodes, wherein each markup language node corresponds to one of a plurality of signature lines, and wherein the tree represents a visual layout of the plurality of signature lines in the electronic document;
traverse the markup language nodes to determine a visual order of each of the plurality of signature lines;
send a link to the electronic document to a current signer identified by an unsigned signature line among the plurality of signature lines for receiving a current digital signature;
automatically select, based at least in part on the visual order, the unsigned signature line for receiving the current digital signature from the current signer;
receive the current digital signature of the current signer in the selected unsigned signature line, wherein the current digital signature is incorporated into the electronic document; and
in response to receiving the current digital signature of the current signer, send the link to the electronic document including the current digital signature to at least one subsequent signer identified by at least one subsequent unsigned signature line of the plurality of signature lines in the electronic document until digital signatures have been received for each of the plurality of signature lines.

15. The computer-readable storage device of claim 14, the computer-executable instructions further causing the at least one processing unit to:
prior to sending the link to the electronic document, receive metadata for appending to each of the plurality of signature lines in the electronic document, the metadata comprising one or more of the following identifiers: a signer name, an electronic mail address of the signer, and a title of the signer.

16. The computer-readable storage device of claim 15, wherein automatically selecting the unsigned signature line for receiving the current digital signature from the current signer comprises:
selecting an identifier contained within the metadata for each of the plurality of signature lines in the electronic document; and
selecting a signature line from among the plurality of signature lines having an identifier which matches at least one of an electronic mail address or a title determined for the current signer as the unsigned signature line for receiving the current digital signature from the current signer.

17. The computer-readable storage device of claim 14, further comprising:
assigning a number to each of the plurality of markup language nodes corresponding to the visual order.

18. The computer-readable storage device of claim 17, wherein assigning a number to each of the plurality of markup language nodes corresponding to the visual order comprises assigning each number to the plurality of markup language nodes in at least one of a left-to-right visual order and a right-to-left visual order.

19. The computer-readable storage device of claim 14, wherein automatically selecting the unsigned signature line for receiving the current digital signature from the current signer comprises:
traversing the visual layout of the plurality of signature lines in the electronic document for previously received digital signatures; and
selecting the first unsigned signature line as the unsigned signature line for receiving the current digital signature from the current signer.

20. The computer-readable storage device of claim 14, wherein the current digital signature is a signature graphic.

* * * * *